June 10, 1924.
S. S. DAYKIN
1,497,071
AUTOMATIC ARC WELDING MACHINE
Filed May 2, 1921
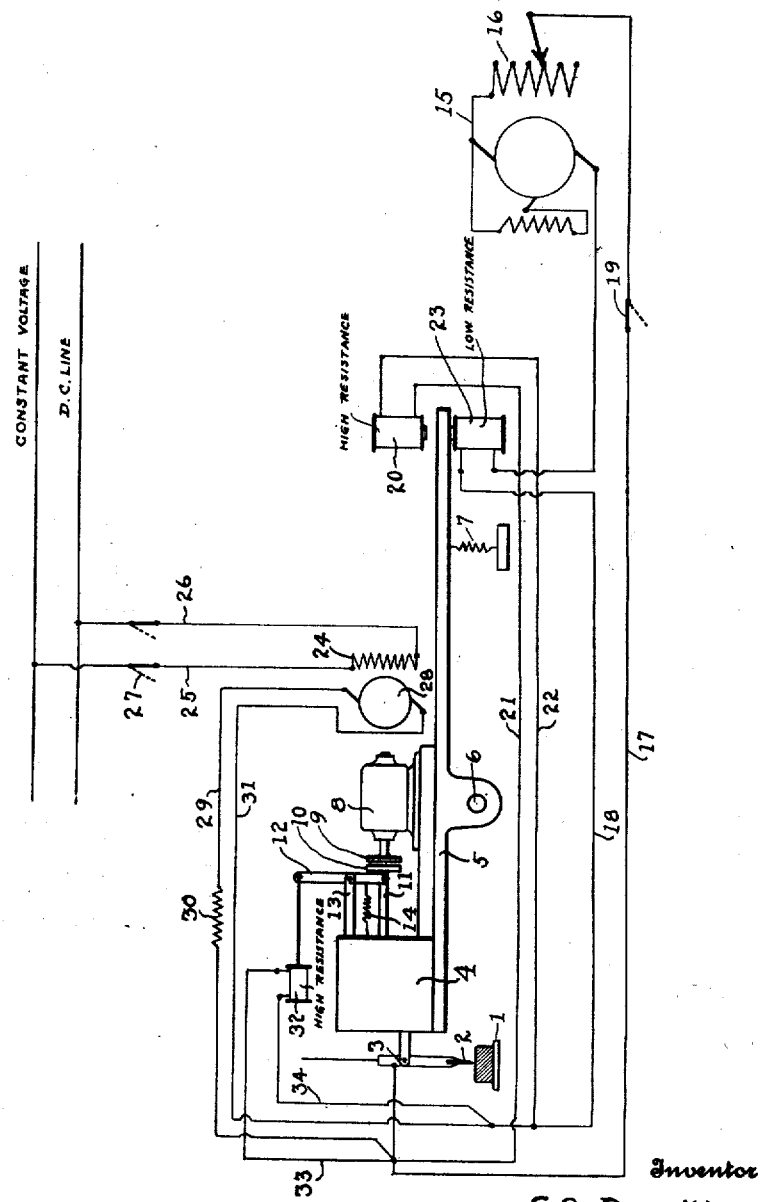
Inventor
S.S.Daykin
By
Lloyd L. Evans
Attorney Patented June 10, 1924.

1,497,071

UNITED STATES PATENT OFFICE.

SPENSLEY S. DAYKIN, OF CLEVELAND, OHIO, ASSIGNOR TO THE HYDRAULIC STEEL COMPANY, OF CLEVELAND, OHIO, A CORPORATION OF OHIO.

AUTOMATIC ARC-WELDING MACHINE.

Application filed May 2, 1921. Serial No. 466,210.

*To all whom it may concern:*

Be it known that I, SPENSLEY S. DAYKIN, a citizen of the United States, residing at Cleveland, in the county of Cuyahoga and State of Ohio, have invented a certain new and useful Improvement in Automatic Arc-Welding Machines, of which the following is a full, clear, and exact description, reference being had to the accompanying drawings.

This invention relates to arc welding machines of the automatic type in which the work is fed continuously past an automatic wire electrode feeding head to continuously weld successive portions of the article.

It is the object of this invention to simplify the mechanism for automatically striking the arc and also to simplify the electrode feeding mechanism.

It is also an object of this invention to provide mechanism capable of maintaining a more uniform arc and capable of more quickly restoring the arc to the proper length on any variation therefrom.

The accompanying drawing forming a part of this specification shows a partially diagrammatic view of the machine with the electrical connections to the various parts.

The work is carried by a support 1 indicated diagrammatically in the drawing. The work may be moved in the desired manner with respect to the electrode during the welding operation.

The wire electrode 2 is supported above the work by means of feed rolls 3 adapted to be driven from reduction gearing (not shown) within the reduction gear casing 4.

The casing 4 is mounted upon a support 5 pivoted intermediate its ends at 6 and provided with a suitable counterbalance 7. The support 5 also carries an electric motor 8 adapted to be connected with the electrode feeding mechanism within the casing 4 by means of a friction clutch comprising a disk 9 fixed to the motor shaft and a disk 10 fixed to a shiftable shaft 11 carried by the casing 4. For engaging and disengaging the clutch a lever 12 is suitably attached to the shaft 11 and pivoted at an intermediate point to an arm 13 rigidly mounted on the casing 4. A coil spring 14 connected to the casing 4 and to the arm 12 below its pivot serves to hold normally the disk 10 out of engagement with the disk 9.

Welding current is supplied from a generator 15. The series field 16 of the generator 15 is connected through a line 17 with the electrode 2. The work is connected through line 18 to the negative armature brush of the generator 15, completing the welding circuit. A starting switch 19 is located in the line 17. Above the support 5 on the side of the pivot 6 opposite the electrode feeding mechanism is mounted a high resistance solenoid coil 20 which is connected to the line 17 through a line 21 and to the line 18 through a line 22. Arranged opposite the coil 20 and below the support 5 is a low resistance coil 23 in the return line 18.

The field 24 of the feed motor 8 is preferably connected through lines 25 and 27 with a constant voltage direct current line. A cut out switch 27 is provided in the circuit of the feed motor field. The positive brush of the armature 28 of the feed motor 8 is connected through a line 29 having a protective resistance 30 therein to the line 17. The negative brush of the armature 28 is connected through a line 31 to the return line 18 of the welding circuit.

A high resistance coil 32, the plunger of which is connected to the clutch lever 12, is connected through line 34 to the line 17 of the welding circuit, and through the line 34 with the return line 18 of the welding circuit.

*Operation.*

Assuming the electrode support to be in raised position and feed motor field switch 27 closed, on closing the starting switch 19, current flows from field 16 through line 17 and through line 21 to the high resistance coil 20, thence through line 22 to the return line 18 and through the low resistance coil 23 to the negative brush of the generator 15. Current also flows from line 17 through line 29, feed motor armature 28, and line 21 to the return line 18, and from line 17 through line 33, coil 32 and line 34 to the return line 18. At this period of the operation the low resistance coil 23 is in series with the high resistance coil 20 and by reason of the high resistance in the line the current through the coil 23 is of low amperage, consequently the pull exerted by the coil 20 greatly exceeds that exerted by the coil 23 and the end of the support 5 is raised by the coil 20, moving the welding head bodily toward the work.

The passage of current through the feed motor armature 28 on closing the switch 19 as above described, starts the motor and the passage of current through the coil 32 will start to shift the clutch disk 10 into engagement with the disk 9.

On contact of the electrode 2 with the work, current flows from line 17 directly through the electrode and work to the return line 18 and through low resistance coil 23 to the generator, short circuiting coil 32 and permitting spring 14 to pull the disk 10 to disengaging position. The coil 20 at this period of the operation is in parallel with the coil 23, and by reason of its high resistance and by reason of the low resistance through the electrode and work, receives only a small proportion of the current, also, since the line resistance is greatly reduced, the amperage through the coil 23 is greatly increased. Consequently the pull of the solenoid 23 greatly exceeds that of the coil 20 and the end of the support 5 is pulled down lifting the electrode feeder bodily and striking an arc between the electrode and work.

As the end of the electrode 2 is consumed in the arc, the voltage across the arc increases and the current through coil 32 which is connected in a shunt circuit across the arc increases until the coil 32 develops sufficient pull to overcome spring 14 and throw the clutch disk 10 into engagement with the clutch disk 9 whereupon the electrode 2 is fed toward the work.

Increase of voltage across the arc also causes more current to flow through the armature 28 of the feed motor 8 speeding it up and tending to maintain a constant arc. Increase of voltage across the arc also causes more current to flow through the coil 20 which is in shunt with the arc. If arc lengthens until a predetermined voltage is established across the arc or until the arc breaks, the coil 20 will exert a greater pull than the coil 23 and the electrode feeding head will be moved bodily toward the work to reduce the length of the arc or to restrike the arc if the arc has been broken.

In case the electrode is fed faster than it is consumed in the arc and the arc becomes too short voltage across the arc will be lessened and less current will flow through the coil 32. When this current through the coil 32 is decreased to a predetermined amount, the pull of the coil 32 will become less than that of the spring 14 and the clutch will be disengaged. The electrode then remains stationary until it has burned off sufficiently to establish enough voltage across the arc to force the requisite current through the coil 32 to again shift the clutch into engagement and start the electrode to feeding.

It will be apparent that during the operation of the machine any variations in the voltage across the arc will be instantaneously adjusted. The effect of increased voltage will be to speed up the feed motor and increase the pull of the coil 32, pressing the clutch disk 10 more firmly into engagement with the disk 9. If this does not effect the necessary reduction in voltage the coil 20 starts to raise the end of support, adding the effect of bodily movement of the electrode feeder to the feeding movement thereof. The effect of decreased voltage across the arc is to decrease the speed of the feed motor and reduce the pull of the coil 32, reducing the pressure of the friction disk 10 against the disk 9 permitting slippage between them. If this does not immediately reestablish the proper voltage, the disk 10 becomes entirely disconnected from the disk 9, allowing the electrode to burn off until the proper voltage is established.

Having described my invention, what I claim is:

1. In an arc welding machine, an electrode, a work support, a welding circuit connected through the electrode and work, mechanism for feeding the electrode to the work, means normally disconnected from said feed mechanism for driving said feed mechanism, a shiftable clutch normally held in disengaging position for connecting said driving means to said feeding mechanism and means connected with the welding circuit operable when a predetermined voltage is established across the arc to shift said clutch into engagement.

2. In an arc welding machine, an electrode, a work support, a welding circuit connected through the electrode and work, means for feeding the electrode toward the work and means for rendering said feeding means operative to feed the electrode when a predetermined voltage is established across the arc, rendering said feeding means inoperative when said voltage across the arc falls below said predetermined amount, and against rendering said feeding means operative when a sufficient amount of the electrode has been consumed in the arc to reestablish said predetermined voltage.

3. In an arc welding machine, an electrode, a work support, a welding circuit connected through the electrode and work, feeding means for said electrode including a clutch, and a high resistance solenoid coil connected in parallel with the arc for shifting said clutch.

4. In an arc welding machine, an electrode, a work support, a welding circuit connected through the electrode and work, electrode feeding mechanism, driving means for said feeding mechanism, a clutch for connecting said driving means to said feeding mechanism, a shifting lever connected to the clutch, a spring normally holding said clutch out of engagement, and a high resistance solenoid connected in parallel with the arc for moving said lever to shift said clutch into engagement.

5. In an arc welding machine, an electrode, a work support, a movable electrode support, a welding circuit connected through said electrode and work, a control switch in said circuit, electrical means connected in parallel with the arc to initially move said support toward the work on the closing of said switch, electrical means in series with the arc operable immediately upon passage of current through the work to shift said support away from the work to strike an arc between the electrode and work.

6. In an arc welding machine, an electrode, a movable electrode support, a work support, an arc welding circuit through the electrode and work, a high resistance shunt coil connected across the arc for moving said electrode support toward the work, a low resistance coil in series with the arc for moving said support away from the work.

7. In an arc welding machine, an electrode, a movable electrode support, a work support, an arc welding circuit connected through said electrode and work, a switch in said circuit, means operable upon the closing of said switch to shift said movable electrode support toward the work, means operable upon contact of the electrode with the work to shift said support away from the work.

8. In an arc welding machine, a movable welding head, electrode feeding mechanism carried by said head, means for moving said head bodily toward and from the work during the welding operation and means for rendering said feeding means operative and inoperative during the welding operation.

9. In an arc welding machine, an electrode, a work support, an arc welding circuit connected through the electrode and work, mechanism for feeding the electrode toward the work, means constantly driven in one direction for driving said feeding mechanism, a friction clutch for connecting said feeding mechanism to said driving means, means normally holding said clutch out of engagement, and means controlled by the voltage across the arc for shifting said clutch into engagement to connect said feeding mechanism to said driving means.

10. In an arc welding machine, an electrode, a work support, a welding circuit connected through the electrode and work, mechanism for feeding said electrode toward the work including a friction clutch, clutch controlling means operable to hold said clutch in engaging position while a predetermined voltage is maintained across the arc and to release said clutch when said voltage falls below said predetermined amount.

11. In an arc welding machine, a welding head, means on said head for holding an electrode, a pivoted support for said head, a work support, a welding circuit connected through the electrode and work, a high resistance coil on one side of said pivoted support and connected in parallel with the arc, to shift said support about its pivot in one direction and a low resistance coil on the opposite side of the support connected in series with the arc for shifting said support in the opposite direction.

12. In an arc welding machine, an electrode, a movable support for the electrode, a work support, a welding circuit, connected through the electrode and work, and means controlled from the welding circuit to simultaneously move the electrode with respect to its support and the support bodily toward the work.

13. In an arc welding machine, an electrode, a movable support for the electrode, a work support, a welding circuit connected through the electrode and work, means carried by said electrode support for feeding the electrode toward the work and means controlled from the welding circuit to simultaneously increase the speed of the electrode feeding means and move said electrode support bodily toward the work.

14. In an arc welding machine, an electrode, a movable support for the electrode, a work support, a welding circuit through the electrode and work, means carried by said support to feed the electrode toward the work, a motor for driving said feeding means, connections from said welding circuit to said motor to increase the speed thereof as the voltage across the arc increases, and means controlled from the welding circuit and operable upon the establishment of a predetermined voltage across the arc to move said electrode support bodily toward the work.

15. In an arc welding machine, an electrode, a work support, a welding circuit connected through the electrode and work, mechanism for feeding said electrode toward the work including a friction clutch, means normally holding said clutch in disengaging position, and means controlled from the welding circuit holding said clutch in engagement in opposition to said first mentioned holding means and exerting a variable pressure thereon.

16. In an arc welding machine, an electrode, a work support, a welding circuit connected through the electrode and work, mechanism for feeding said electrode toward the work, including a shiftable friction clutch, a spring normally holding said clutch in engagement, a coil in a shunt circuit across the arc connected to said clutch in opposition to said spring and operable to exert a pressure on said clutch proportional to the voltage across the arc.

In testimony whereof, I hereunto affix my signature.

SPENSLEY S. DAYKIN.